(12) United States Patent
Aerts et al.

(10) Patent No.: US 11,965,602 B2
(45) Date of Patent: Apr. 23, 2024

(54) VALVE FOR A VACUUM APPARATUS

(71) Applicant: Atlas Copco Airpower N.V., Antwerp (BE)

(72) Inventors: Johan Gustaaf Karel Aerts, Antwerp (BE); Ronny Antoine J. Cools, Antwerp (BE); Nils Van Hoof, Antwerp (BE)

(73) Assignee: ATLAS COPCO AIRPOWER N.V., Wilrijk (BE)

( * ) Notice: Subject to any disclaimer, the term of this patent is extended or adjusted under 35 U.S.C. 154(b) by 63 days.

(21) Appl. No.: 17/905,996

(22) PCT Filed: Mar. 9, 2021

(86) PCT No.: PCT/EP2021/055885
§ 371 (c)(1),
(2) Date: Sep. 9, 2022

(87) PCT Pub. No.: WO2021/180699
PCT Pub. Date: Sep. 16, 2021

(65) Prior Publication Data
US 2023/0094347 A1    Mar. 30, 2023

(30) Foreign Application Priority Data

Mar. 11, 2020   (BE) .................................. 2020/5173

(51) Int. Cl.
*F16K 17/04*        (2006.01)
*F16K 27/02*        (2006.01)
(Continued)

(52) U.S. Cl.
CPC ...... *F16K 17/0413* (2013.01); *F16K 27/0209* (2013.01); *F16K 41/12* (2013.01); *F16K 51/02* (2013.01)

(58) Field of Classification Search
CPC .. F16K 17/0413; F16K 27/0209; F16K 41/12; F16K 51/02
See application file for complete search history.

(56) References Cited

U.S. PATENT DOCUMENTS 2,931,378 A    4/1960  Davies
3,712,578 A    1/1973  Dawson
(Continued)

FOREIGN PATENT DOCUMENTS

CN    102808986 A    12/2012
EP      2918882 A1    9/2015
(Continued)

OTHER PUBLICATIONS

PCT Notification of Transmittal of the International Search Report and the Written Opinion of the International Searching Authority, or the Declaration and PCT International Search Report dated May 14, 2021 for corresponding PCT application Serial No. PCT/EP2021/055885, 6 pages.
(Continued)

*Primary Examiner* — P. Macade Nichols
(74) *Attorney, Agent, or Firm* — Theodore M. Magee; Westman, Champlin & Koehler, P.A.

(57) ABSTRACT

A valve for a vacuum apparatus includes a first housing element and a second housing element wherein an outer chamber is defined by the first housing element and the second housing element. The first housing element has a first opening and the second housing element has a second opening in fluid communication with the first opening via the outer chamber. An inner chamber is defined by the first housing element and the second housing element wherein a membrane is disposed in the inner chamber. A sealing element is connected to the membrane and is moveable from a first position to a second position wherein in the first position the sealing element closes the first opening in a (Continued)

leak-tight manner and in the second position the sealing element opens the first opening to allow a gaseous medium to flow through the valve.

14 Claims, 1 Drawing Sheet

(51) Int. Cl.
*F16K 41/12* (2006.01)
*F16K 51/02* (2006.01)

(56) References Cited

U.S. PATENT DOCUMENTS

| | | |
|---|---|---|
| 3,893,475 A | 7/1975 | Hudson |
| 2016/0369915 A1* | 12/2016 | Vu ............... F16K 27/0236 |
| 2021/0148477 A1* | 5/2021 | Canjuga ............ F16K 3/265 |

FOREIGN PATENT DOCUMENTS

| | | |
|---|---|---|
| GB | 1480960 | 7/1977 |
| JP | H07293735 A | 11/1995 |

OTHER PUBLICATIONS

PCT Written Opinion dated May 14, 2021 for corresponding PCT application Serial No. PCT/EP2021/055885, 8 pages.

* cited by examiner

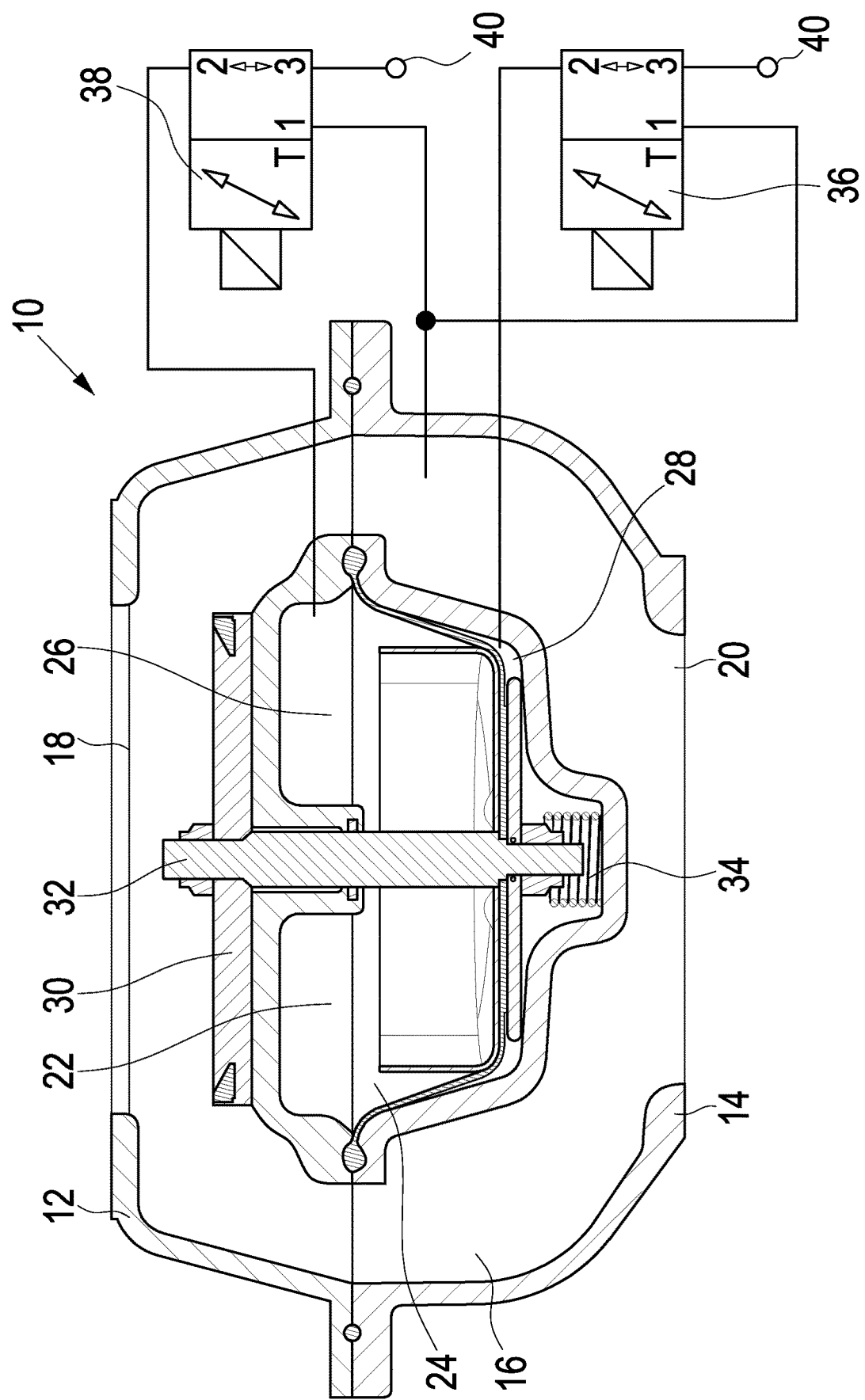

VALVE FOR A VACUUM APPARATUS

CROSS-REFERENCE TO RELATED APPLICATION

This application is a Section 371 National Stage Application of International Application No. PCT/EP2021/055885, filed Mar. 9, 2021, and published as WO 2021/180699 A1 on Sep. 16, 2021, the content of which is hereby incorporated by reference in its entirety and which claims priority of Belgian Application No. BE2020/5173, filed Mar. 11, 2020.

FIELD

The present invention relates to a valve for a vacuum apparatus and such a vacuum apparatus.

BACKGROUND

Usually a valve is disposed between a vacuum pump and a recipient or a vacuum chamber. Upon stop of operating of the vacuum pump the valve is closed to maintain the vacuum inside the vacuum chamber and second to avoid that lubricant is drawn by the vacuum from the vacuum pump into the vacuum chamber and contaminate the vacuum chamber.

The discussion above is merely provided for general background information and is not intended to be used as an aid in determining the scope of the claimed subject matter. The claimed subject matter is not limited to implementations that solve any or all disadvantages noted in the background.

SUMMARY

Known valves are butterfly valves. However, these valves suffer from an extreme wear of the seal resulting from the rotating movement of the valve disc in the butterfly valve. Further, compressed air is required to control such butterfly valve according to the prior art.

Further, most of the known return valves do not open completely at low inlet pressures resulting in a high pressure drop and resulting in performance drops.

Hence, it is an object of the present invention to provide a valve which is less complex and does not need pressurized air to be controlled.

The above given problem is solved by a valve in accordance with claim 1 and a vacuum apparatus in accordance with claim 12.

The valve for vacuum apparatus in accordance to the present invention comprises a first housing element and a second housing element connected with the first housing element. The first housing element and the second housing element defining an outer chamber. Further, the first housing element has a first opening that can be connected to a vacuum chamber and the second housing element has a second opening that can be connected to vacuum pump. First opening and second opening are in fluid communication via the outer chamber to allow a gaseous medium to flow from the first opening to the second opening and vice versa through the valve if the valve is in an open state. Further, an inner chamber is defined by the first housing element and the second housing element wherein a membrane is disposed in the inner chamber dividing the inner chamber in a first inner chamber and a second inner chamber. A sealing element is connected to the membrane wherein the sealing element is moveable in conjunction with the membrane or movement of the membrane from a first position to a second position.

In the first position the sealing element closes the first opening in a leaktight or vacuum tight manner. In the second position the sealing element opens the first opening to allow a gaseous medium to flow through the valve. Due to movement of the membrane the sealing element is moved from a first position corresponding to a closed valve to a second position corresponding to an open valve. No pressurized air is necessary in order to move the membrane within the inner chamber. While the outer chamber defines a chamber through which the gaseous medium is flowing between the vacuum chamber and the vacuum pump the inner chamber comprising a membrane is utilized in order to control the state of the valve.

Preferably, the inner chamber is at least partially and more preferably completely surrounded by the outer chamber. This might have the advantage of compact design.

Preferably, the first opening and the second opening are arranged on one axis. Thus, the gaseous medium can easily flow through the valve. In particular the first opening and the second opening are not arranged for example in an angled configuration reducing thereby the vacuum conductivity.

Preferably, the second inner chamber is connected to the vacuum and the first inner chamber is connected to a higher pressure or atmosphere or ambient pressure to move the sealing element from the first position into the second position. Due to the pressure difference between the second inner chamber and the first inner chamber the membrane in the inner chamber is moving and thereby moving the sealing element to the second position. Hence, during operation, when the vacuum pump has created sufficient lower pressure the membrane and together with the membrane the sealing element moves into the second position and the valve opens.

Preferably, a first channel is connecting the second inner chamber to the region of low pressure preferably of the valve. More preferably, the first channel is connected to the second housing element. If the vacuum pump is running, a vacuum is created in the region of the second housing element. More preferably, the first channel is connected to the outer chamber. Then, by the first channel the second inner chamber is connected to the region of low pressure or vacuum.

Preferably, a first 3-way valve is disposed in the first channel. The 3-way valve is connected by the first channel to the second inner chamber and can selectively connect the second inner chamber either to the region of low pressure or to atmosphere or ambient pressure. Thus, by the 3-way valve the second inner chamber is switchable between low pressure or vacuum, thereby moving the sealing element in the second position, or atmosphere pressure thereby moving the sealing element into the first position, i.e. closing the valve. Thus, by controlling the first 3-way valve, the valve can be completely controlled. No further energy such as pressurized air is necessary.

Preferably, a second channel is connecting the first inner chamber to atmosphere or ambient pressure. Thus, by the first inner chamber atmosphere or ambient pressure can be applied to the first inner chamber to create a pressure difference with the second inner chamber to move the sealing element.

Preferably, a second 3-way valve is disposed in the second channel selectively connecting the first inner chamber to atmosphere or ambient pressure or to a region of low pressure, i.e. vacuum. More preferably, the 3-way valve is able to selectively connect the first inner chamber to the second housing element and/or the outer chamber.

Preferably, the first 3-way valve is a solenoid valve and preferably a normally closed solenoid valve. Alternatively or additionally the second 3-way valve is a solenoid valve and more preferably a normally closed solenoid valve.

Preferably, the diameter of the sealing element is smaller than the diameter of the first opening. Thus, the sealing element can be assembled to the membrane before connecting the first housing element to the second housing element.

Preferably, the membrane is fixed between the first housing element and the second housing element.

Preferably, the sealing element seals the first opening against a flange connectable to the first opening. Preferably, the flange is a flange of the vacuum chamber connected to the first opening of the valve.

Preferably, a spring is connected to the sealing element. The spring constant of the spring is adapted to compensate only for the mass of the sealing element. Thus, the spring is not configured to counteract any pressure difference of the first inner chamber and second inner chamber. Thus, no large spring forces are present in the valve simplifying assembly of the valve and service. More preferably, the spring constant of the spring is between 1 to 10 N/mm, and even more preferably between 1 to 5 N/mm Preferably, no pressurized air is used to open and close the valve i.e. moving the sealing element from the first position to the second position and/or from the second position to the first position.

Further, the present invention relates to vacuum apparatus with a valve as previously described. Further, a vacuum pump is connected to the second opening of the valve and a vacuum chamber is connected to the first opening of the valve. Thus, by the valve it is possible to separate the vacuum pump from the vacuum chamber upon stop of operation of the vacuum pump to maintain the vacuum inside the vacuum chamber.

Further, the vacuum apparatus comprises a control unit wherein the first 3-way valve is connected to the control unit. The control unit is configured to connect the second inner chamber with the low-pressure region by the first 3-way valve to move the sealing element into the second position if the pressure of the low-pressure region is below the pressure in the first inner chamber. Thus, upon operation of the vacuum pump the low-pressure region preferably inside the outer chamber has a pressure below atmosphere or ambient pressure. Thus, by connecting the second inner chamber with the low-pressure region the sealing element is forced into the second position due to the pressure difference.

Preferably, the control unit is configured to connect the second inner chamber with atmosphere by the first 3-way valve to move the sealing element into the first position. This is irrespective of the pressure in the low-pressure region during the normal operation of the valve since then the first inner chamber is connected to atmosphere or ambient pressure. If the second inner chamber is now connected to atmosphere by the control unit controlling the first 3-way valve, the sealing element is moved into the first position.

Preferably, the control unit is connected to the second 3-way valve and further configured to connect the first inner chamber with the low-pressure region by the second 3-way valve while the second inner chamber is connected to atmosphere by the first 3-way valve to keep the sealing element in the first position even if pressure in the low-pressure region is below atmosphere. This situation can be used to purge the vacuum pump, i.e. running the vacuum pump without pumping to increase the temperature of the vacuum pump to purge the vacuum pump.

The summary is provided to introduce a selection of concepts in a simplified form that are further described in the detailed description. This summary is not intended to identify key features or essential features of the claimed subject matter, nor is it intended to be used as an aid in determining the scope of the claimed subject matter.

BRIEF DESCRIPTION OF THE DRAWINGS

In the following the present invention is described by the accompanied FIGURE.

FIG. 1 shows an embodiment of the present invention.

DETAILED DESCRIPTION

The valve 10 in accordance to the present invention comprises a first housing element 12 and a second housing element 14 connected to each other. By the first housing element 12 and the second housing element 14 an outer chamber 16 is defined. Further, the first housing element 12 comprises a first opening 18 and the second housing element 14 comprises a second opening 20. The first opening 18 is in fluid communication with the second opening 20 via the outer chamber 16. Thereby the first opening 18 can be connected to a vacuum chamber by a flange and the second opening 20 can be connected to a vacuum pump. Thus, the pressure in the outer chamber 16 mainly equates to the pressure at the inlet of the vacuum pump connected to the second opening 20.

By the first housing element 12 and the second housing element 14 an inner chamber 22 is defined. Between the first housing element 12 and the second housing element 14 a membrane 24 is attached separating the inner chamber 22 into a first inner chamber 26 (in the shown FIGURE above the membrane 24) and a second inner chamber 28 (in the shown FIGURE below the membrane 24).

A sealing element 30 is connected with the membrane 24 wherein the sealing element 30 comprises a sealing disk. The sealing element 30 further comprises a shaft 32 connecting the disk of the sealing element 30 with the membrane 24. The sealing element 30 moves in connection with movement of the membrane 24. Thus, the sealing element 30 can be moved from a first position to a second position. In the first position the sealing element closes the first opening 18. In a second position as shown in the FIGURE, the first opening 18 is open and a gaseous medium can flow through the valve 10.

With the shaft 32 of the sealing element 30 a spring 34 is connected. The spring 34 is a weak spring only adapted to compensate for the mass of the sealing element 30 (including the shaft 32 and the sealing disk) to maintain the sealing element 30 in the first position if no pressure difference is present between the first inner chamber 26 and the second inner chamber 28.

Further, in the embodiment showing in the FIGURE a first 3-way valve 36 and a second 3-way valve 38 is connected to the valve 10. In particular, the second inner chamber 28 can be connected by the first 3-way valve 36 either to atmosphere 40 or to the low-pressure region inside the valve. Further, the first inner chamber 26 can be connected by the second 3-way valve 38 either to atmosphere 40 or to the low-pressure region of the outer chamber 16. In an alternative embodiment only the first 3-way valve 36 is used while the first inner chamber 26 is directly connected to the atmosphere 14 without the possibility to connect the first inner chamber 26 to the low-pressure region of the outer chamber 16 by the second 3-way valve 38. Thus, this embodiment only uses the first 3-way valve and avoiding the second 3-way valve 38.

The valve functions as follows: during normal operation by the second 3-way valve 38 the first inner chamber 26 is connected to atmosphere 40. At the beginning also the second inner chamber 28 is connected by the first 3-way valve 36 to atmosphere 40. Thus, no pressure difference exists between the first inner chamber 26 and the second inner chamber 28. Thus, by the spring 34 the sealing element 30 is forced into the first position sealing the first opening. In particular if a vacuum chamber is connected to the first opening 18 wherein in the vacuum chamber a low pressure vacuum exists, the sealing element 30 is forced into the first position by the pressure difference between the pressure in the vacuum chamber and the pressure in the outer chamber 16. Thus, for start of operation the second inner chamber 28 is connected to the low-pressure region of the outer chamber 16 by the first 3-way valve 36. However, due to the pressure difference between the vacuum chamber connected to the first opening 18 and the pressure in the outer chamber 16 the sealing element 30 still remains in the first position. Then the vacuum pump connected to the second opening 20 is started and the outer chamber 16 is evacuated. If then the pressure difference between the vacuum chamber and the outer chamber is almost the same the sealing element 30 is forced into the second position or due to the pressure difference between the first inner chamber 26 and the second inner chamber 28. As stated above during normal operation the first inner chamber 26 is at atmosphere pressure while the second inner chamber 28 is at the pressure of the outer chamber 16 which is lowered due to evacuation by the vacuum pump connected to the second opening 20. Then the sealing element is positioned in the second position opening the first opening 18 and thus a gaseous medium from the vacuum chamber connected to the first opening 18 can flow directly through the valve and through the second opening 20 towards the vacuum pump connected to the second opening 20. Before stop of the vacuum pump the second inner chamber 28 is then connected by the first 3-way valve 36 to atmosphere 40. Thus, there is no pressure difference between the first inner chamber 26 and the second inner chamber 28. Due to the spring 34 the sealing element 30 is forced into the first position sealing the first opening 18. Upon venting of the vacuum pump or if the outer chamber 16 is vented and due to the vacuum and the vacuum chamber connected to the first opening 18 the sealing element is then forced to stay in the first position.

If it is necessary to purge the vacuum pump, i.e. let the vacuum pump run with closed inlet being closed by the present valve, the functionality of the valve is reversed by the second 3-way valve 38. Thus, if the sealing element is in the first position and upon start of the vacuum pump the first inner chamber 26 is connected by the second 3-way valve 38 to the low-pressure region of the outer chamber 16. At the same time the second inner chamber 28 is connected by the first 3-way valve 36 to atmosphere. Since at the beginning there is no pressure difference between the first inner chamber 26 and the second inner chamber 28 the sealing element 30 remains in the first position by the pressure difference between the vacuum chamber connected to the first opening 18 and the outer chamber 16. During operation of the vacuum pump the outer chamber 16 is evacuated and a vacuum starts to build up. Thus, by the second 3-way valve 38 a vacuum is generated in the first inner chamber 26 while at the second inner chamber 28 atmospheric pressure is maintained. Due to this pressure difference the sealing element 30 is still forced into the first position even if the pressure in the outer chamber 16 is below the pressure of the vacuum chamber connected to the first opening 18. During this operation mode the vacuum pump can be efficiently purged while maintaining the inlet of the vacuum pump closed by the present valve.

Thus, a valve is provided which is less complex can be easily serviced due to no strong spring forces and can be controlled without pressurized air.

Although elements have been shown or described as separate embodiments above, portions of each embodiment may be combined with all or part of other embodiments described above.

Although the subject matter has been described in language specific to structural features and/or methodological acts, it is to be understood that the subject matter defined in the appended claims is not necessarily limited to the specific features or acts described above. Rather, the specific features and acts described above are described as example forms of implementing the claims.

The invention claimed is:

1. A valve for a vacuum apparatus, comprising
a first housing element and a second housing element connected with the first housing element, wherein an outer chamber is defined by the first housing element and the second housing element,
wherein the first housing element has a first opening and the second housing element has a second opening in fluid communication with the first opening via the outer chamber,
wherein an inner chamber is defined by the first housing element and the second housing element, wherein a membrane is disposed in the inner chamber dividing the inner chamber in a first inner chamber and a second inner chamber,
wherein a sealing element is connected to the membrane, wherein the sealing element is movable from a first position to a second position, wherein in the first position the sealing element closes the first opening in a leaktight manner and in the second position the sealing element opens the first opening to allow a gaseous medium to flow through the valve,
wherein the inner chamber is at least partially and preferably completely surrounded by the outer chamber.

2. The valve according to claim 1, characterized in that the second inner chamber is connected to vacuum and the first inner chamber is connected to a higher pressure or atmosphere pressure to move the sealing element from the first position into the second position.

3. The valve according to claim 1, characterized by a first channel connecting the second inner chamber to a region of low pressure, and in particular to the second housing element and/or the outer chamber.

4. The valve according to claim 3 characterized in that a first 3-way valve is disposed in the first channel connected to atmosphere.

5. The valve according to claim 1, characterized by a second channel connecting the first inner chamber to atmosphere.

6. The valve according to claim 5, characterized in that a second 3-way valve is disposed in the second channel connected to a region of low pressure, and in particular to the second housing element and/or the outer chamber.

7. The valve according to claim 4, characterized in that the first and/or second 3-way valve is a solenoid valve and preferably a normally closed solenoid valve.

8. The valve according to claim 1, characterized in that the diameter of the sealing element is smaller than the diameter of the first opening.

9. The valve according to claim 1, characterized in that the sealing element seals the first opening against a flange connectable to the first opening.

10. The valve according to 1, characterized in that a spring is connected to the sealing element, wherein the spring constant of the spring is adapted to compensate only for mass of the sealing element.

11. A vacuum apparatus with a valve according to claim 1, a vacuum pump connected to the second opening of the valve and a vacuum chamber connected to the first opening of the valve to separate the vacuum pump from the vacuum chamber.

12. The vacuum apparatus according to claim 11, characterized by a control unit, wherein the first 3-way valve is connected to the control unit, wherein the control unit is configured to connect the second inner chamber with the low pressure region by the first 3-way valve to move the sealing element in the second position if the pressure of the low pressure region is below the pressure in the first inner chamber.

13. The vacuum apparatus according to claim 12, characterized in that the control unit is configured to connect the second inner chamber with the atmosphere by the first 3-way valve to move the sealing element into the first position.

14. The vacuum apparatus according to claim 12, characterized in that the control unit is connected to the second 3-way valve and configured to connect the first inner chamber with the low pressure region by the second 3-way valve, while the second inner chamber is connected to atmosphere by the first 3-way valve to keep the sealing element in the first position even if pressure in the low pressure region is below atmosphere.

* * * * *